United States Patent Office 3,598,804
Patented Aug. 10, 1971

---

3,598,804
PREPARATION OF KETALS
Nathan Chadwick Hindley, Welwyn Garden City, and Michael James O'Leary, Welwyn, England; Niklaus Halder, Oberwil, Switzerland, and Gerald Myer Jaffe, Verona, and Peter Hans Weinert, Wayne, N.J., assignors to Hoffmann-La Roche Inc., Nutley, N.J.
No Drawing. Filed Apr. 4, 1969, Ser. No. 813,714
Claims priority, application Great Britain, Feb. 4, 1969, 5,862/69
Int. Cl. C07c 47/18
U.S. Cl. 260—209R                    26 Claims

ABSTRACT OF THE DISCLOSURE

Preparation of ketal sugars from sugars by reacting the sugar with a ketone or aldehyde utilizing ferric chloride or ferric bromide as a catalyst and a water immiscible inert organic solvent having a boiling point of less than 55° C.

BACKGROUND

In the past, ketal sugars have been prepared by reacting the sugar with a ketone or aldehyde and removing the water formed from the reaction by distillation of a water-ketone or water-aldehyde mixture. For example, a ketal sugar such as 2,3:4,6-diacetone-L-sorbose, an important intermediate in the preparation of ascorbic acid (Vitamin C), has been prepared by reacting acetone and L-sorbose and removing the water formed by distillation of an acetone-water mixture. In carrying out this procedure, a large excess amount of the ketone or aldehyde reactant, such as acetone, must be utilized in the reaction to remove the water and allow the formation of the ketal. Therefore, in order to efficiently carry out this reaction by this procedure, a ketone such as acetone has to be utilized in an amount of at least 400 times the weight of the sugar utilized.

The use of such large quantities of ketone or aldehyde provides many problems. Large and expensive equipment must be utilized in order to produce ketal sugar by this method. Furthermore, large quantities of heat are necessary to distill the ketone-water or aldehyde-water mixture from the reaction medium. Therefore, the production of a ketal sugar by this process has proven very costly, requiring large equipment and cumbersome handling procedures.

SUMMARY OF THE INVENTION

In accordance with this invention, it has been found that when a sugar of the formula:

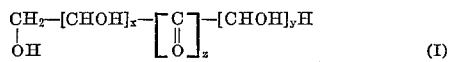
(I)

wherein $x$ is an integer from 1 to 5 and $y$ and $z$ are integers from 0 to 1, is reacted under reflux conditions with a ketone or aldehyde of the formula:

(II)

wherein $R_1$ and $R_2$ are selected from the group consisting of hydrogen, lower alkyl, aralkyl and aryl, and taken together form a lower alkylene radical, utilizing ferric chloride or ferric bromide as a catalyst in a substantially water immiscible liquid organic solvent medium wherein said solvent has a boiling point below 55° C., preferably from about 30° C. to 50° C., a ketal sugar is produced in higher yields than have been obtainable by prior processes. This reaction proceeds in such a manner that the water can be removed from the reaction zone by distillation at a rate comparable to its formation. This allows no substantial build-up of water in the reaction zone. In this manner, water can be removed from the reaction zone quickly and easily without the necessity of utilizing large amounts of solvent. Hence, by means of this process, the solvent need only be utilized in an amount of, at most 20 times the weight of the sugar of Formula I above.

Furthermore, by means of the process of this invention, a sugar can be converted into a ketal sugar in yields as high as 94 percent without any substantial formation of difficultly separable by-products. Additionally, by means of the process of this invention, there is no need to utilize large amounts of catalyst since the reaction of this invention proceeds with the use of catalytic amounts of ferric chloride.

The use of a small amount of ferric chloride or ferric bromide catalyst is very advantageous. In the past, a sugar has been converted to its ketal form utilizing large amounts of catalysts such as concentrated sulfuric acid. In this reaction, large excesses of sulfuric acid must be utilized in order to convert the sugar into its ketal form. The use of large amounts of concentrated sulfuric acid has proven extremely disadvantageous since large amounts of alkali must be utilized in neutralizing the sulfuric acid to isolate the ketal. Furthermore, the large amount of neutralized material provides a great waste disposal problem.

The beneficial results of this process are attributable to the use of both ferric chloride or ferric bromide and a water immiscible liquid organic solvent having a boiling point below 55° C. The use of both of these materials produce a rate of reaction whereby the water can be removed from the reaction by distillation at a rate equal to rate of formation of the ketal. This allows the water to be removed from the reaction medium quickly and easily without the necessity of utilizing large amounts of solvent. Furthermore, the use of this combination of catalyst and solvent allows the reaction to proceed without the necessity of utilizing a large amount of catalyst avoiding the neutralization step of the prior art.

DETAILED DESCRIPTION

The reaction of this invention is ideally suited to the production of a 2,3:4,6-diketal sorbose such as 2,3:4,6-diacetone sorbose. This reaction can be illustrated in the following manner:

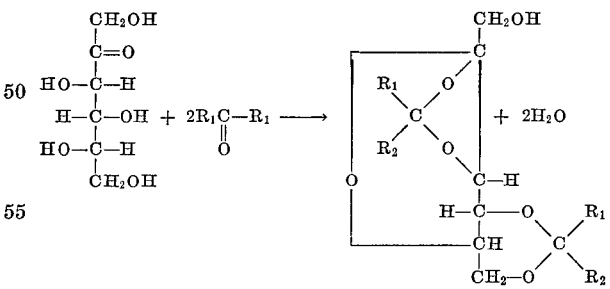

wherein $R_1$ and $R_2$ are as above.

In accordance with an embodiment of this invention, when $z$ in the compound of Formula I above is equal to 0, then the compound of Formula I is a sugar alcohol of the formula:

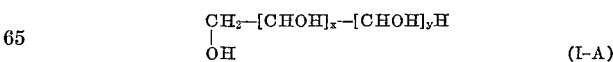
(I-A)

wherein $x$ and $y$ are above.

When the compound of Formula I-A is reacted with the compound of Formula II in accordance with the process of this invention, a ketal is produced in high yields by utilizing only small or catalytic quantities of ferric chloride or ferric bromide.

In accordance with another embodiment of this invention, when $z$ in Formula I above is 1, then the compound of Formula I above is a sugar. In this case, the compound of Formula I above has the following formula:

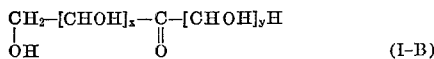
(I-B)

wherein $x$ and $y$ are as above.

When the compound of Formula I-B is reacted with the compound of Formula II in accordance with this invention, a ketal is produced in high yields utilizing only small or catalytic quantities of ferric chloride or ferric bromide.

Among the sugars of Formula I above which can be utilized in accordance with this invention are included ribrose, fructose, glucose, arabinose, mannose, erythrose, heptose, mannitol, pentitol, sorbitol and hexatol.

As used herein, the term "lower alkyl" denotes straight and branched chain hydrocarbons having from 1 to 7 carbon atoms such as methyl, ethyl, propyl, isopropyl, butyl, t-butyl, and the like. The term "aralkyl" denotes phenyl lower alkyl radicals such as benzyl, phenethyl, phenpropyl, etc. The term "aryl" denotes phenyl and phenyl substituted with a lower alkoxy or lower alkyl group. The substituted phenyl groups include methoxyphenyl, polymethoxyphenyl, polyethoxyphenyl, etc. The term "lower alkoxy" denotes lower alkoxy groups containing from 1 to 7 carbon atoms such as methoxy, ethoxy, propoxy, etc. The term "lower alkylene" includes both straight and branched chain alkylene radicals containing from 2 to 7 carbon atoms such as ethylene, propylene, butylene, etc.

In carrying out the reaction of this invention, at least one mole of the compound of Formula II above is present per mole of the compound of Formula I above. If desired, a large excess, such as 6 moles of the compound of Formula II above per mole of the compound of Formula I above, can be present in the reaction medium. If it is desired to produce a diketal of the compound of Formula I, then 2 moles of the compound of Formula II are reacted per mole of the compound of Formula I.

In forming the ketal in accordance with this invention, any compound of the Formula II above can be utilized. Among the preferred aldehydes or ketones of the Formula II above, which can be utilized in accordance with this invention, are included methyl-ethyl-ketone, formaldehyde, acetaldehyde, benzylaldehyde, dibenzyl ketone, diphenylethyl ketone, cycloheptanone, cylohexanone, etc. The preferred compound of Formula II above is acetone.

The reaction of this invention is carried out in the presence of ferric chloride catalyst or ferric bromide. Generally, it is preferred to utilize catalytic quantities of ferric chloride or ferric bromide. Therefore, in accordance with a preferred embodiment of this invention, the ferric chloride or ferric bromide can be utilized in an amount of from about 0.1 percent by weight to about 10 percent by weight, based upon the weight of sugar of Formula I utilized as the starting material. If desired, large quantities of ferric chloride or ferric bromide, i.e., amounts greater than 20 percent by weight, based upon the weight of the sugar of Formula I, can be utilized in carrying out this reaction. However, it is seldom desired to utilize such large quantities of ferric chloride or ferric bromide since no addition beneficial results are achieved thereby.

In carrying out this reaction, any conventional water immiscible liquid inert organic solvent having a boiling point of at most 55° C. can be utilized. Generally, it is preferred to utilize an inert organic water immiscible solvent having a boiling point of from 30° C. to 50° C. In accordance with the invention, the solvent that is utilized should be substantially water immiscible. Among the solvents which can be utilized in accordance with this invention are included pentane, ethyl bromide, methylene chloride, 1,2-dichloroethylene, 2-chloropropane, 1-chloropropane, isoprene, etc. The beneficial results, of this invention can be obtained by utilizing these solvents in an amount of at least 5 ml. of solvent per gram of the sugar of Formula I. If desired, the solvent can be utilized in amounts of greater than 100 ml. of solvent per gram of sorbose. While any amount of solvent can be utilized in carrying out this reaction, it is generally preferred to avoid the use of excess solvents, since the use of excess solvents requires larger equipment and more heat for distillation. Generally, it is preferred to utilize the inert organic water immiscible solvent in an amount of from about 5 ml. to 100 ml. per gram of the sugar of Formula I above.

In carrying out the reaction of this invention, the solvent and water entrained therein are removed from the reaction medium by distillation. Any conventional means of distillation can be utilized to carry out this reaction in accordance with this invention. The distillate from the reaction mixture is condensed to form a water layer and a solvent layer. The solvent layer can, if desired, be recycled back into the reaction medium after the water layer is separated therefrom. Any conventional means of separating the water layer from the solvent layer can be utilized.

In carrying out this reaction, any suitable conditions for refluxing the reaction medium can be utilized. Generally, the reaction is carried out at the reflux temperature of the reaction mixture. Atmospheric pressure can be utilized. However, lower temperatures also can be utilized with a suitable vacuum to reflux the reaction mixture.

The term "ketal" as used herein is defined to include any dialkoxy alkane containing compound wherein both alkoxy groups are attached to the same carbon atom of the alkane moiety. The term "ketal" includes acetals.

The term "ferric chloride" and "ferric bromide" as utilized throughout the specification includes ferric chloride and ferric bromide in both their anhydrous and hydrated forms.

The following examples are illustrative but not limitative of this invention.

Example 1

This example is directed to producing 2,3:4,6-diacetone-L-sorbose by means of the process of this invention.

20 grams of L-sorbose, 0.8 grams of ferric chloride, 200 ml. of acetone and 200 ml. of pentane were placed in a 1 liter flask equipped with a stirrer, thermometer, a vapor tube condenser and liquid receiver for receiving the distillate from the condenser. The mixture was stirred and refluxed at 35° C. for 9 hours under atmospheric pressure. During this period, the solvent, acetone and water formed in the reaction were distilled from the flask, condensed and collected in the receiver. In the receiver, two layers formed; a lower aqueous layer and a solvent layer. The lower aqueous layer was continually removed and the upper layer was continually recycled into the reaction flask. After nine hours, the reaction was stopped and the residue remaining in the flask was cooled to 10° C. To the cooled residue there was added 5.5 ml. of 4 N-sodium hydroxide to adjust the pH of the residue to about 9. The residue was filtered to remove any solids. After the solids were removed, the residue was washed with 50 ml. of acetone. After washing, the residue was concentrated at a temperature of about 40° C. to 50° C. under a vacuum of 50 mm. Hg. to produce crude 2,3:4,6-diacetone-L-sorbose. This crude product was dissolved in 50 ml. of toluene and extracted with five 10 ml. portions of 0.05 N-sodium hydroxide. The aqueous phase which resulted from the washings was separated from the organic layer and was re-extracted with five 50 ml. portions of toluene. The toluene portions were collected. The toluene layers were neutralized with 2 N-hydrochloric acid to produce a pH of about 7.0. The neutralized toluene layer was concentrated at a temperature of 40° C. to 50° C. under a vacuum of 5 mm. Hg. to produce 26 grams of pure 2,3:4,6-diacetone-L-sorbose. This represented a yield of 90 percent, based upon L-sorbose.

Example 2

The procedure of Example 1 was followed except that the solvents listed below were substituted for pentane and the mixture was refluxed at the temperature given below. The same yield of 2,3:4,6-diacetone-L-sorbose was obtained as in Example 1.

TABLE

| Solvent: | Reflux temperature, ° C. |
|---|---|
| Ethyl bromide | 37 |
| Methylene chloride | 38.1 |
| 1,2-dichloroethylene | 45.3 |
| 2-chloropropane | 33.6 |
| 1-chloropropane | 43.4 |

EXAMPLE 3

This example is directed to producing 1,2:3,4:5,6-triacetone-D-sorbitol.

One mole (18.2 g.) of D-sorbitol, 0.8 gram of ferric chloride, 200 ml. of acetone and 200 ml. of pentane were placed in a 1 liter flask equipped with a stirrer, thermometer, a vapor tube, condenser and liquid receiver for receiving the distillate from the condenser. The mixture was stirred and refluxed at 35° C. for 4 hours under atmospheric pressure. During this period, the solvent, acetone and water formed in the reaction were distilled from the flask, condensed and collected in the receiver. In the receiver, two layers formed; a lower aqueous layer and a solvent layer. The lower aqueous layer was continually removed and the upper layer was continually recycled into the reaction flask. After the reaction was stopped, the residue remaining in the flask was cooled to 10° C. To the cooled residue there was added 5.5 ml. of 4 N-sodium hydroxide to adjust the pH of the residue to about 9. The residue was filtered to remove any solids. After the solids were removed, the residue was washed with 50 ml. of acetone. After washing, the residue was concentrated at a temperature of about 40° C. to 50° C. under a vacuum of 50 mm. Hg to produce crude 1,2:3,4:5,6-triacetone-D-sorbitol weighing 32.9 g., M.P. 38.5–44.5°. The crude product was distilled at 80–90° and pressures less than 1 mm. and gave 31.5 g. of purified material which analyzed by GLPC to be >98 percent pure.

EXAMPLE 4

This procedure is directed to the preparation of 1,2:5,6-diacetone-D-glucofuranose.

Twenty grams of anhydrous α-D-glucose, 0.8 gram of ferric chloride, 200 ml. of acetone and 200 ml. of pentane were placed in a 1 liter flask equipped with a stirrer, thermometer, a vapor tube, condenser and liquid receiver for receiving the distillate from the condenser. The mixture was stirred and refluxed at 35° C. for 24 hours under atmospheric pressure. During this period, the solvent, acetone and water formed in the reaction were distilled from the flask, condensed and collected in the receiver. In the receiver, two layers formed; a lower aqueous layer and a solvent layer. The lower aqueous layer was continually removed and the upper layer was continually recycled into the reaction flask. After 24 hours, the reaction was stopped and the residue remaining in the flask was cooled to 10° C. To the cooled residue there was added 6 ml. of 4 N-sodium hydroxide to adjust the pH of the residue to about 9. The residue was filtered to remove any solids. After the solids were removed, the residue was washed with 50 ml. of acetone. After washing, the residue was concentrated at a temperature of about 40° C. to 50° C. under a vacuum of 50 mm. Hg to produce crude 1,2:5,6-diacetone-D-glucofuranose, a yellow solid weighing 22.1 g. Analysis of the crude product by GLPC showed 1,2:5,6-diacetone-D-glucofuranose present in 90 percent, the remaining material consisted of the known two mono acetone derivatives of glucose and a small amount of unreacted glucose. The yield of the desired product was therefore 19.9 g. or 69 percent of theory.

We claim:

1. A process for producing a diketal comprising reacting sorbose with a carbonyl compound of the formula:

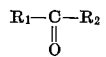

wherein $R_1$ and $R_2$ are selected from the group consisting of hydrogen, lower alkyl, aralkyl and aryl, and taken together form a lower alkylene radical, in a liquid, water immiscible inert organic solvent having a boiling point of less than 55° C. in the presence of ferric chloride or ferric bromide catalyst, and distilling off the water formed by said reaction from the reaction medium as a mixture with said inert solvent during said reaction.

2. The process of claim 1 wherein said solvent has a boiling point of from about 30° C. to about 50° C.

3. The process of claim 2 wherein said solvent is pentane.

4. The process of claim 1 wherein said ferric chloride or ferric bromide is present in an amount of from about 0.1 percent to 10 percent by weight, based upon the weight of the sorbose.

5. The process of claim 1 wherein said solvent is present in the reaction medium in an amount of from about 5 ml. to 100 ml. per gram of sorbose.

6. The process of claim 1 wherein said carbonyl compound is acetone.

7. A process for producing a diketal comprising
(a) providing a reaction medium composed of a carbonyl compound of the formula:

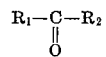

wherein $R_1$ and $R_2$ are selected from the group consisting of hydrogen, lower alkyl, aralkyl, and aryl, and taken together form a lower alkylene radical; sorbose, a liquid, water immiscible, inert, organic solvent having a boiling point below 55° C.;
(b) reacting said medium in the presence of a ferric chloride or ferric bromide catalyst while distilling off the water formed by said reaction in the form of a mixture with said solvent;
(c) condensing said distillate to form a condensate having an organic solvent layer and an aqueous layer;
(d) separating said aqueous layer from said organic solvent layer and recycling said organic solvent layer into reaction medium.

8. The process of claim 7 wherein said solvent has a boiling point of from about 30° C. to about 50° C.

9. The process of claim 7 wherein said solvent is pentane.

10. The process of claim 7 wherein said ferric chloride is present in an amount of from about 0.1 percent to 10 percent by weight, based upon the weight of the sorbose.

11. The process of claim 7 wherein said solvent is present in the reaction medium in an amount of from about 5 ml. to 100 ml. per gram of sorbose.

12. The process of claim 7 wherein said carbonyl compound is acetone.

13. A process for producing a ketal comprising reacting a sugar of the formula:

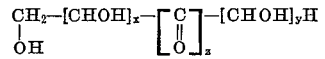

wherein $x$ is an integer from 1 to 5, and $y$ and $z$ are integers from 0 to 1, with a carbonyl compound of the formula:

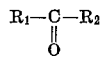

wherein $R_1$ and $R_2$ are selected from the group consisting of hydrogen, lower alkyl, aralkyl and aryl, and taken together form a lower alkylene radical, in a liquid, water immiscible inert organic solvent having a boiling point of less than 55° C. in the presence of ferric chloride or ferric bromide catalyst, and distilling off the water formed by said reaction from the reaction medium as a mixture with said inert solvent during said reaction.

14. The process of claim 13 wherein said solvent has a boiling point of from about 30° C. to about 50° C.

15. The process of claim 13 wherein said solvent is pentane.

16. The process of claim 13 wherein said sugar has the formula:

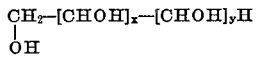

wherein $x$ is an integer from 1–5 and $y$ is an integer from 0–1.

17. The process of claim 16 wherein said solvent has a boiling point of from about 30° C. to about 50° C.

18. The process of claim 13 wherein said sugar has the formula:

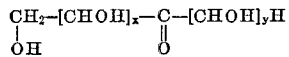

wherein $x$ is an integer from 1–5 and $y$ is an integer from 0–1.

19. The process of claim 18 wherein said solvent has a boiling point of from about 30° C. to about 50° C.

20. A process for producing a ketal compound comprising (a) providing a reaction medium composed of a carbonyl compound of the formula:

wherein $R_1$ and $R_2$ are selected from the group consisting of hydrogen, lower alkyl, aralkyl and aryl, and taken together form a lower alkylene radical, a sugar of the formula:

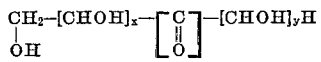

wherein $x$ is an integer from 1 to 5 and $y$ and $z$ are integers from 0 to 1, in a liquid, water immiscible, inert organic solvent having a boiling point below 55° C.;

(b) reacting said medium in the presence of a ferric chloride or ferric bromide catalyst while distilling off the water formed by said reaction in the form of a mixture with said solvent;

(c) condensing said distillate to form a condensate having an organic solvent layer and an aqueous layer;

(d) separating said aqueous layer from said organic solvent layer and recycling said organic solvent layer into reaction medium.

21. The process of claim 20 wherein said solvent has a boiling point of from about 30° C. to about 50° C.

22. The process of claim 20 wherein said solvent is pentane.

23. The process of claim 20 wherein said ferric chloride or ferric bromide is present in an amount of from about 0.1 percent to 10 percent by weight, based upon the weight of the sugar.

24. The process of claim 20 wherein said solvent is present in the reaction medium in an amount of from about 5 ml. to 100 ml. per gram of the sugar.

25. The process of claim 20 wherein said sugar has the formula:

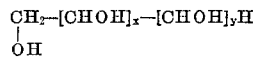

wherein $x$ is an integer from 1–5 and $y$ is an integer from 0–1.

26. The process of claim 20 wherein said sugar has the formula:

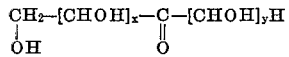

wherein $x$ is an integer from 1–5 and $y$ is an integer from 0–1.

References Cited

UNITED STATES PATENTS

| | | | |
|---|---|---|---|
| 2,715,121 | 8/1955 | Glen et al. | 260—209 |
| 3,096,323 | 7/1963 | Touey et al. | 260—209 |
| 3,277,076 | 10/1966 | Yotsuzuka | 260—209 |
| 3,451,993 | 6/1969 | Goshima et al. | 260—209 |

LEWIS GOTTS, Primary Examiner

J. R. BROWN, Assistant Examiner

US. Cl. X.R.

260—210R